United States Patent
Lee et al.

(10) Patent No.: US 8,718,663 B2
(45) Date of Patent: May 6, 2014

(54) SYSTEM FOR MANAGING INTERFERENCE OF CONTROL CHANNEL

(75) Inventors: Hee Soo Lee, Daejeon (KR); Jae Young Ahn, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 225 days.

(21) Appl. No.: 13/172,400

(22) Filed: Jun. 29, 2011

(65) Prior Publication Data

US 2011/0319091 A1     Dec. 29, 2011

(30) Foreign Application Priority Data

Jun. 29, 2010  (KR) ........................ 10-2010-0061735
Jun. 28, 2011  (KR) ........................ 10-2011-0063037

(51) Int. Cl.
*H04W 72/04* (2009.01)

(52) U.S. Cl.
USPC ............................ 455/450; 455/511; 370/329

(58) Field of Classification Search
USPC ............ 455/450, 464, 41.1–3, 507, 509, 511; 370/328, 329, 312
See application file for complete search history.

(56) References Cited

U.S. PATENT DOCUMENTS

| | | | | |
|---|---|---|---|---|
| 8,331,948 B2 * | 12/2012 | Park et al. | ...................... | 455/450 |
| 2009/0252073 A1 * | 10/2009 | Kim et al. | ...................... | 370/311 |
| 2010/0273468 A1 * | 10/2010 | Bienas et al. | .................. | 455/418 |
| 2011/0128916 A1 * | 6/2011 | Kwon et al. | ................... | 370/328 |
| 2012/0015645 A1 * | 1/2012 | Moon et al. | ................. | 455/422.1 |
| 2012/0063403 A1 * | 3/2012 | Moon et al. | .................... | 370/329 |
| 2013/0223227 A1 * | 8/2013 | Lee et al. | ...................... | 370/236 |

FOREIGN PATENT DOCUMENTS

JP    2009-159452    7/2009

* cited by examiner

*Primary Examiner* — Cong Tran
(74) *Attorney, Agent, or Firm* — Nelson Mullins Riley & Scarborough LLP; Anthony A. Laurentano, Esq.

(57) ABSTRACT

Provided is a system for allocating a radio resource. The system for allocating a radio resource may include a macro base station, a macro terminal, and a femto base station. The femto base station may allocate a radio resource for transmitting a control channel to a femto terminal, and transmit information of the allocated radio resource to the macro base station. The macro base station may allocate a radio resource for transmitting a control channel to the macro terminal in relation to the received information of the radio resource.

9 Claims, 6 Drawing Sheets

SYSTEM FOR MANAGING INTERFERENCE OF CONTROL CHANNEL

CROSS-REFERENCE TO RELATED APPLICATIONS

This application claims the benefit of Korean Patent Application Nos. 10-2010-0061735, filed on Jun. 29, 2010 and 10-2011-0063037, filed on Jun. 28, 2011, the entire disclosures of which are incorporated herein by reference.

BACKGROUND

1. Field of the Invention

The present invention relates to a system for managing interference of a control channel, and more particularly, to a system for reducing interference of a control channel by transmitting control channels using different radio resources between a macro base station and a femto base station.

2. Description of the Related Art

A control channel may not refer to a channel through which data of a user is transmitted. Rather, the control channel may refer to a channel through which control information including information about a scheme of receiving data of a user is transmitted. Thus, when an error occurs in the control information transmitted through the control channel, the data of a user may not be transmitted.

In general, a control channel may be transmitted using a relatively low code rate and a relatively high transmission power so as to withstand a predetermined level of inter-cell interference. However, it may be insufficient for receiving a control channel due to interference received from a neighboring cell particularly in a heterogeneous network environment where different types of cells are included.

SUMMARY

An aspect of the present invention provides a method of reducing interference between neighboring cells in an environment including different types of cells.

Another aspect of the present invention also provides a method of transmitting a control channel using different radio resources between different types of cells.

According to an aspect of the present invention, there is provided a method of allocating a radio resource, the method including allocating a radio resource corresponding to a control channel of a femto base station, and transmitting, to a macro base station, a cell identifier (ID) of a cell to which the femto base station belongs, wherein information of the radio resource is used for allocating a radio resource corresponding to a control channel of the macro base station.

According to another aspect of the present invention, there is provided a method of allocating a radio resource, the method including receiving a cell ID of a cell to which a femto base station belongs, and allocating radio resources to which a control channel of a macro base station is to be allocated, in relation to information of a radio resource corresponding to a control channel of the femto base station.

According to still another aspect of the present invention, there is provided a method of transmitting a control channel, the method including receiving a first control channel from a femto base station, transmitting, to a macro base station, a cell ID of a cell to which the femto base station belongs, receiving, from the macro base station, information of a second radio resource allocated in relation to information of a first radio resource, and receiving, from the macro base station, a second control channel using the second radio resource.

According to an aspect of the present invention, it is possible to reduce interference between neighboring cells in an environment where different types of cells are included.

According to another aspect of the present invention, it is possible to transmit a control channel using difference radio resources between different types of cells.

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION

Figure 1:
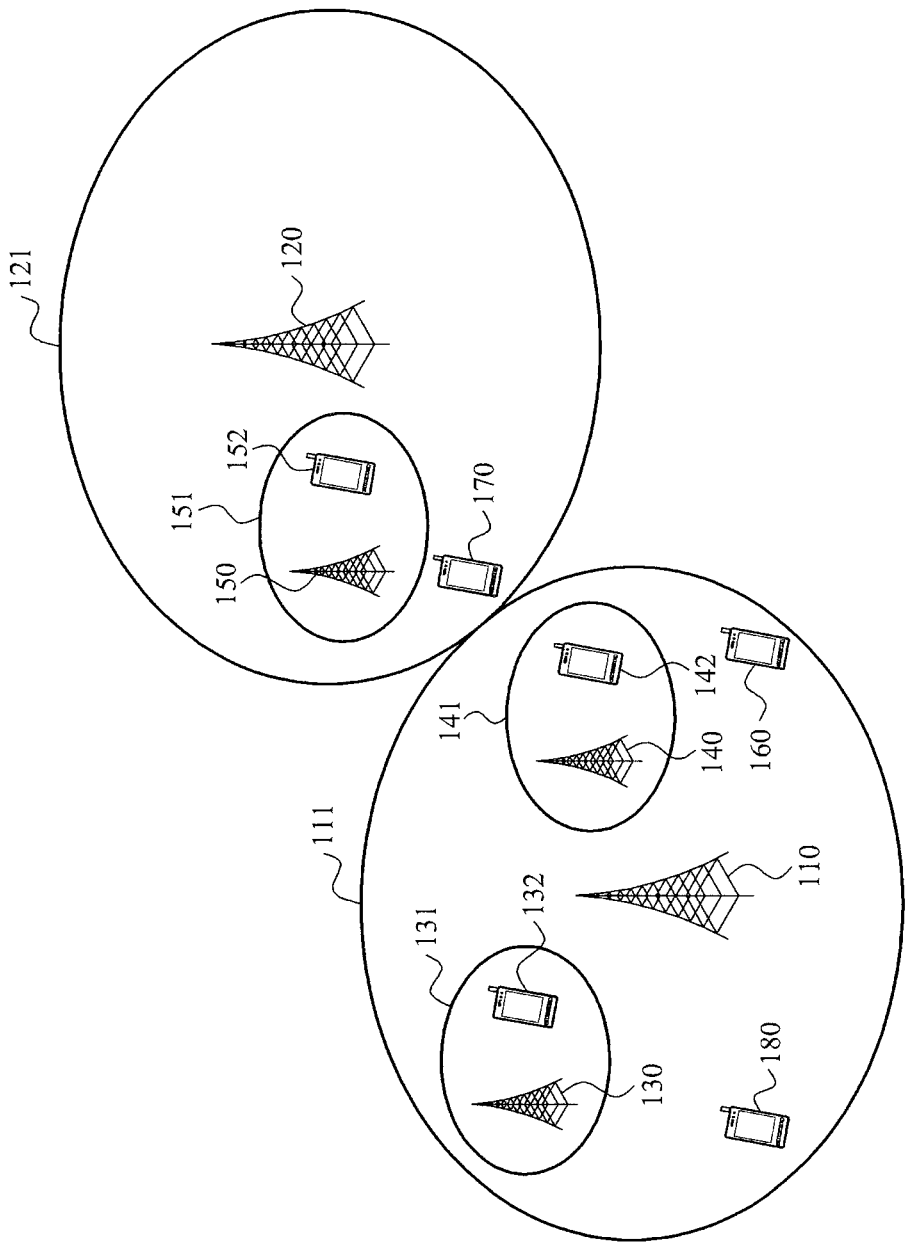
FIG. 1 is a diagram illustrating a configuration of a system for managing interference according to an embodiment of the present invention.

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

FIG. 1 is a diagram illustrating a configuration of a system for managing interference according to an embodiment of the present invention.

The system for managing interference according to an embodiment of the present invention may include macro base stations 110 and 120 and femto base stations 130, 140, and 150. Even through terms such as the macro base stations 110 and 120 and the femto base stations 130, 140, and 150 are used in this specification, the system for managing interference according to an embodiment of the present invention may include a different type of base station, and manage interference between different types of base stations. Thus, a pico base station may be included in addition to the femto base stations 130, 140, and 150, and a macro base station, a femto base station, and a pico base station may coexist.

Two macro terminals 160 and 180 may be located within a coverage area 111 of the first macro base station 110. The femto base stations 130 and 140 may receive a control channel from femto terminals 132 and 142 within coverage areas 131 and 141, respectively.

The two macro terminals 160 and 180 may be adjacent to the femto base stations 130 and 140. The two macro terminals 160 and 180 may transmit a control channel to the macro base station 110. The control channel transmitted by the macro terminals 160 and 180 may affect the femto base stations 130 and 140 as an interference signal. Since a distance between the macro terminals 160 and 180 and the femto base stations 130 and 140 is less than a distance between the macro terminals 160 and 180 and the macro base station 110, the control channel transmitted by the macro terminals 160 and 180 may affect the femto base stations 130 and 140 as relatively strong interference.

A macro terminal 170 located within a coverage area 121 of the second macro base station 120 may transmit a control channel to the second macro base station 120. In this instance, the femto base station 150 may receive relatively strong interference from the macro terminal 170. Thus, the femto base station 150 may not receive a control channel from a femto terminal 152 located within a coverage area 151.

In this instance, an error may occur in control information transmitted using a control channel between the femto base stations 130, 140, and 150 and the femto terminals 132, 142, and 152. Thus, the femto base stations 130, 140, and 150 may not successfully decode data of a user transmitted from the femto terminals 132, 142, and 152, and efficiency of a data transmission may be extremely deteriorated.

Figure 2:
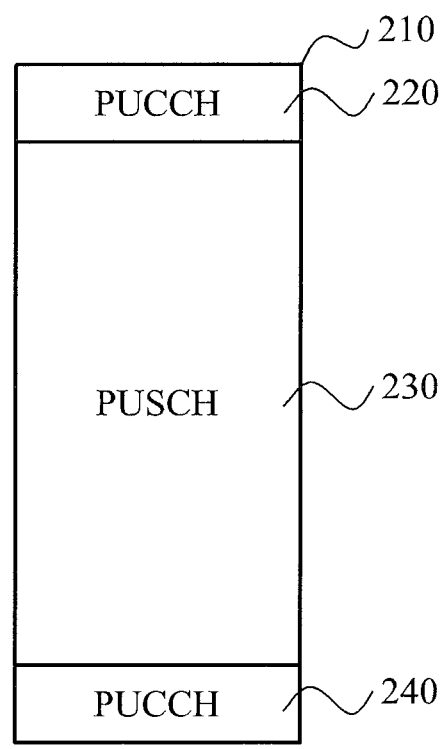
FIG. 2 is a diagram illustrating an allocation of a radio resource in an uplink of a 3rd Generation Partnership Project Long Term Evolution (3GPP LTE) system.

FIG. 2 is a diagram illustrating an allocation of a radio resource in an uplink of a 3rd Generation Partnership Project Long Term Evolution (3GPP LTE) system. Referring to FIG. 2, a horizontal axis indicates time and a vertical axis indicates a frequency band.

A physical uplink control channel (PUCCH) corresponding to a control channel for transmitting control information is placed at both ends 220 and 240 of the frequency band in a uplink radio resource 210 of the 3GPP LTE system. A physical uplink shared channel (PUSCH) corresponding to a data channel for transmitting data of a user is placed at an intermediate portion 230 of the frequency band.

In a system for transmitting data according to an embodiment of the present invention, inter-cell interference may be reduced by allocating a radio resource used for a macro base station to receive a control channel and a radio resource used for a femto base station to receive a control channel to be difference from each other.

Figure 3:
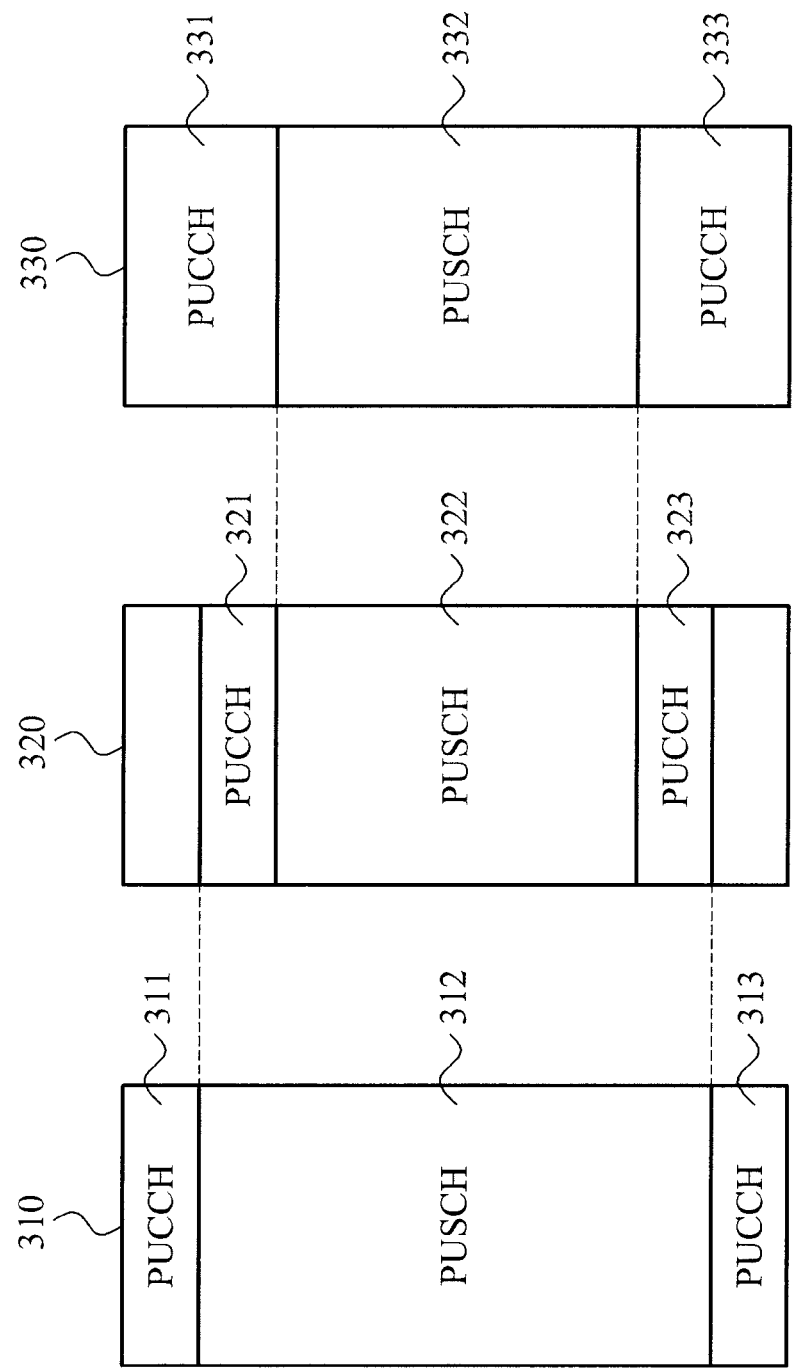
FIG. 3 is a diagram illustrating an allocation of a radio resource according to an embodiment of the present invention.

FIG. 3 is a diagram illustrating an allocation of a radio resource according to an embodiment of the present invention.

A first femto base station and a second femto base station are assumed to be located within a coverage area of a macro base station and receive interference from the macro base station.

According to an embodiment of the present invention, the first femto base station may use, as radio resources 311 and 313 for receiving control channels, a frequency band 311 located at an uppermost range and a frequency band 313 located at a lowermost range in an uplink radio resource 310. The first femto base station may use, as a radio resource for transmitting data, another radio resource 312 other than the radio resources 311 and 313 for receiving control channels. The second femto base station may transmit a control channel using radio resources 321 and 323.

The macro base station may transmit a control channel to a terminal using a radio resource that is not used by the first femto base station or the second femto base station.

According to an embodiment of the present invention, the macro base station may receive information of a radio resource allocated by a femto base station. The macro base station may transmit, to a terminal, a control channel using another radio resource other than a radio resource allocated by the femto base station.

Figure 4:
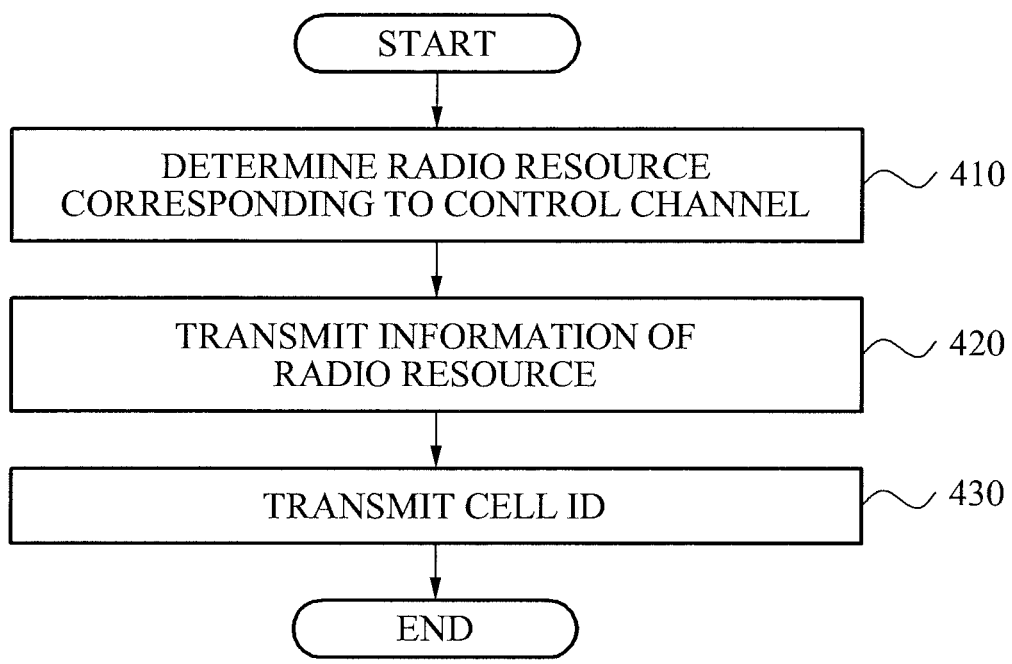
FIG. 4 is a flowchart illustrating a method of allocating a radio resource according to an embodiment of the present invention.

FIG. 4 is a flowchart illustrating a method of allocating a radio resource according to an embodiment of the present invention.

In operation 410, a femto base station may allocate a radio resource corresponding to a control channel. The femto base station may transmit information of the radio resource to a femto terminal located within a coverage area of the femto base station, and receive a control channel from the femto terminal using the radio resource.

In operation 420, the femto base station may transmit information of the allocated radio resource to a macro base station. According to an embodiment of the present invention, the femto base station may transmit, to the macro base station, a cell identifier (ID) of the femto base station in operation 430. When the macro base station receives pieces of information of a radio resource from a plurality of femto base stations, the macro base station may distinguish radio resources using the cell ID.

According to an embodiment of the present invention, the cell ID may refer to a physical layer cell ID or a global ID of the cell.

The macro base station may determine a range of radio resources for transmitting a control channel by the macro base station, in relation to information of a radio resource received from the femto base station. According to an embodiment of the present invention, a determined range of radio resources may include a radio resource allocated to transmit a control channel by the femto base station.

The femto base station may transmit cell IDs to terminals within a coverage area. When a macro terminal is located within a coverage area of the femto base station, the macro terminal may receive a cell ID of the femto base station. That is, macro terminals transmitting strong interference to the femto base station may correspond to terminals receiving cell IDs from the femto base station.

The macro terminals may transmit, to the macro base station, the cell IDs received from the femto base station. The macro base station may receive, from a plurality of macro terminals within a coverage, a cell ID of a femto base station adjacent to each macro terminal. The macro base station may determine a femto base station adjacent to each macro terminal.

The macro base station may select a different radio resource from a radio resource of a femto base station adjacent to a macro terminal, and allocate a control channel. That is, a radio resource for transmitting a control channel to a predetermined macro terminal may be different from a radio resource for transmitting a control channel by a femto base station adjacent to the predetermined macro terminal.

Referring to FIG. 1, a first femto base station 130 may transmit, to a macro base station 110, information of a first radio resource used for the first femto base station 130 to receive a control channel from a first femto terminal 132. A second femto base station 140 may transmit, to the macro base station 110, information of a second radio resource used for the second femto base station 140 to receive a control channel from a second femto terminal 142.

The macro base station 110 may allocate a radio resource that may be used for the macro base station 110 to receive a control channel from a first macro terminal 180 and a second macro terminal 160, using information of the first radio resource and information of the second radio resource. In this instance, the radio resource that may be used for the macro base station 110 to receive a control channel from macro terminals 160 and 180 may include the first radio resource and the second radio resource.

The first macro terminal 180 adjacent to the first femto base station 130 may receive a cell ID of the first femto base station 130 from the first femto base station 130, and transmit the received cell ID to the macro base station 110. The second macro terminal 160 may transmit a cell ID of the second femto base station 140 to the macro base station 110.

The macro base station 110 may allocate the second radio resource, which is different from the first radio resource, as a radio resource for receiving a control channel from the first macro terminal 180 adjacent to the first femto base station 130. When the first macro terminal 180 transmits a control channel using the second radio resource, interference from the first macro terminal 180 affecting the first femto base station 130 may be minimized.

The macro base station 110 may allocate the first radio resource, which is different from the second radio resource, as a radio resource for receiving a control channel from the second macro terminal 160 adjacent to the second femto base station 140. When the second macro terminal 160 transmits a control channel using the first radio resource, interference from the first macro terminal 180 affecting the second femto base station 140 may be minimized.

According to an embodiment of the present invention, a femto base station may allocate a radio resource according to a cell ID of the femto base station in operation 410. When the femto base station determines a radio resource according to a cell ID, the femto base station may not transmit information of the radio resource to a macro base station, and may transmit only the cell ID.

When the femto base station determines a radio resource according to a cell ID, radio resources allocated by each femto base station may not overlap each other and thus, radio resources may be effectively used.

Figure 5:
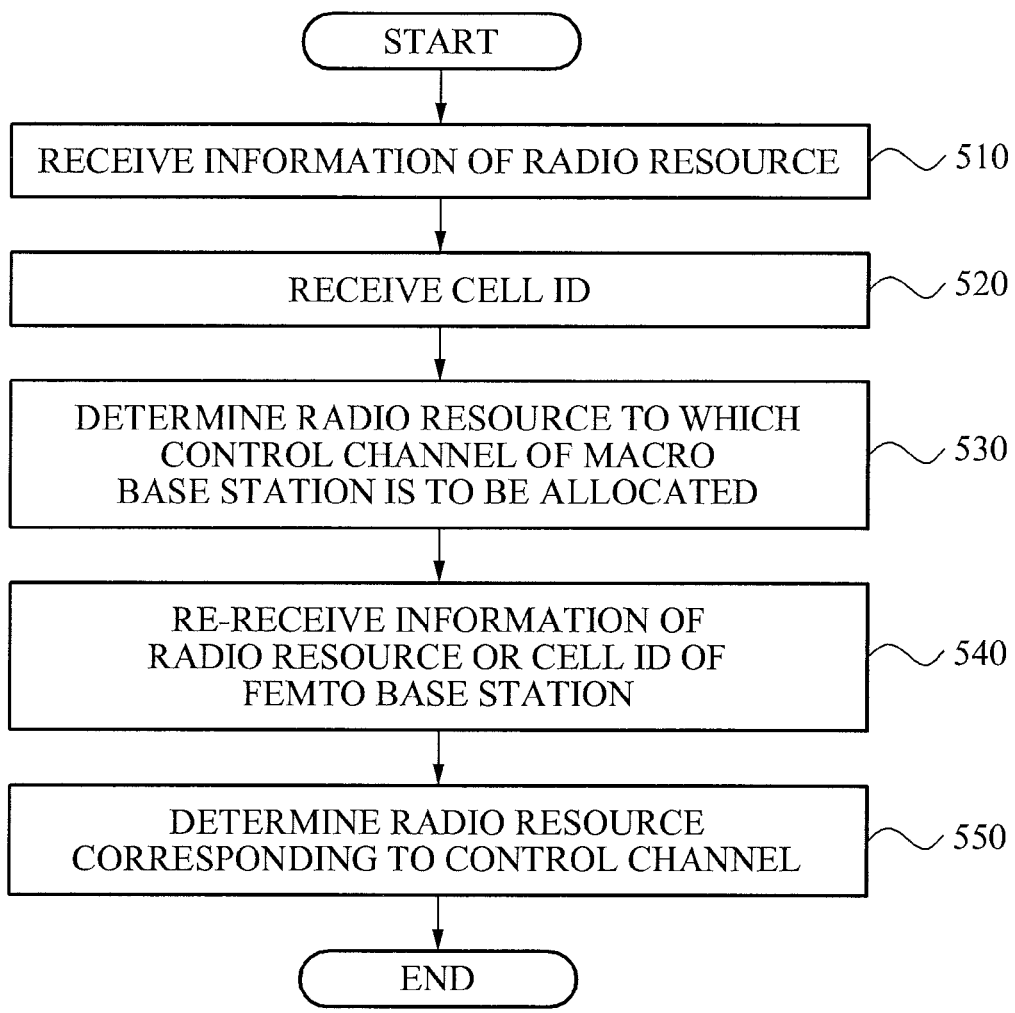
FIG. 5 is a flowchart illustrating a method of allocating a radio resource according to another embodiment of the present invention.

FIG. 5 is a flowchart illustrating a method of allocating a radio resource according to another embodiment of the present invention.

In operation 510, a macro base station may receive information of a radio resource from a femto base station. The information of a radio resource may include information about a frequency band and a time interval of a radio resource used for the femto base station to receive a control channel from a femto terminal.

In operation 520, the macro base station may receive a cell ID of the femto base station. According to an embodiment of the present invention, the cell ID may refer to a physical layer cell ID or a global ID of a cell to which the femto base station belongs. The radio resource received in operation 510 may be allocated according to the cell ID of the femto base station. When the femto base station determines a radio resource according to a cell ID, radio resources allocated by each femto base station may not overlap each other and thus, radio resources may be effectively used. Each macro terminal may not receive the information of a radio resource in operation 510, and may receive only a cell ID in operation 520.

In operation 530, the macro base station may determine a range of radio resources to which a control channel of the macro base station may be allocated. A radio resource to which a control channel of the macro base station may be allocated refers to a radio resource for receiving a control channel from a macro terminal to the macro base station. According to an embodiment of the present invention, the macro base station may determine a radio resource to which a control channel of the macro base station may be allocated, in relation to a radio resource of each femto base station.

In operation 540, the macro base station may re-receive, from a macro terminal adjacent to the femto base station, information of a radio resource of the femto base station or a cell ID of the femto base station. The macro base station may be aware of a radio resource or a cell ID of a femto base station receiving a relatively strong interference signal from the macro terminal.

In operation 550, the macro base station may allocate a radio resource for receiving a control channel from a macro terminal among radio resources to which a control channel of the macro base station may be allocated, in relation to the re-received information of a radio resource or the re-received cell ID.

According to an embodiment of the present invention, the macro base station may allocate a different radio resource from a femto base station adjacent to the macro terminal as the radio resource for receiving a control channel from the macro terminal.

Figure 6:
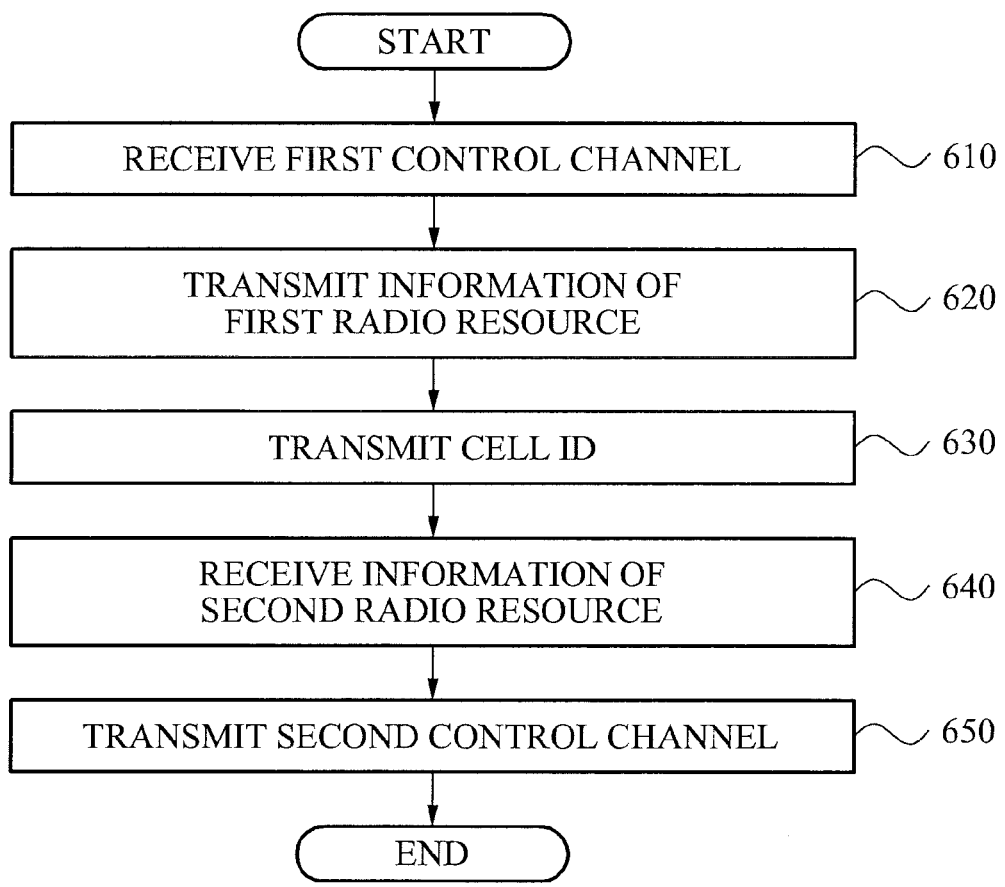
FIG. 6 is a flowchart illustrating a method of receiving a control channel using a radio resource allocated according to an embodiment of the present invention.

FIG. 6 is a flowchart illustrating a method of receiving a control channel using a radio resource allocated according to an embodiment of the present invention.

In operation 610, a macro terminal may receive a first control channel from a femto base station. According to an embodiment of the present invention, the macro terminal may compare a signal strength of the first control channel with a threshold. When the signal strength of the first control is greater than the threshold, the macro terminal may determine that the macro terminal is adjacent to the femto base station and relatively strongly interfere with the femto base station.

In operation 610, the macro terminal may receive the first control channel from the femto base station, using a first radio resource. In this instance, the macro terminal may transmit, to a macro base station, information of the first radio resource in operation 620.

In operation 630, the macro terminal may transmit, to the macro base station, a cell ID of a cell to which the femto base station belongs. According to an embodiment of the present invention, the cell ID may refer to a physical layer cell ID or a global ID of the cell.

According to an embodiment of the present invention, the first radio resource may be allocated according to the cell ID of the femto base station.

In operation 640, the macro terminal may receive a second radio resource from the macro base station. According to an embodiment of the present invention, the second radio resource may correspond to a radio resource allocated in relation to information of the first radio resource. For example, the second radio resource may be allocated to be different from the first radio resource.

In operation 650, the macro terminal may transmit a second control channel to the macro base station using the second radio resource.

The above-described exemplary embodiments of the present invention may be recorded in non-transitory computer-readable media including program instructions to implement various operations embodied by a computer. The media may also include, alone or in combination with the program instructions, data files, data structures, and the like. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations of the above-described exemplary embodiments of the present invention, or vice versa.

Although a few exemplary embodiments of the present invention have been shown and described, the present invention is not limited to the described exemplary embodiments. Instead, it would be appreciated by those skilled in the art that changes may be made to these exemplary embodiments without departing from the principles and spirit of the invention, the scope of which is defined by the claims and their equivalents.

What is claimed is:

1. A method of allocating a radio resource, the method comprising:

allocating a radio resource corresponding to a control channel of a femto base station;

transmitting, to a macro base station, information of the allocated radio resource; and transmitting, to the macro base station, a cell identifier (ID) of a cell to which the femto base station belongs to enable the macro base station to correlate the cell ID with the control channel, wherein information of the radio resource is used for allocating a radio resource corresponding to a control channel of the macro base station such that a macro terminal transmitting the cell ID of the femto base station to the macro base station is provided with a different radio resource for allocation of a control channel of the macro base station.

2. The method of claim 1, wherein the cell ID refers to a physical layer cell ID or a global ID of the cell.

3. The method of claim 1, wherein the allocating comprises allocating the radio resource according to the cell ID.

4. A method of allocating a radio resource, the method comprising:

receiving, at a macro base station, information indicative of allocation of a radio resource corresponding to a control channel of a femto base station by the femto base station;

receiving a cell identifier (ID) of the femto base station;

receiving an indication of the cell ID from a macro terminal receiving communications from the femto base station; and allocating radio resources to which a control channel of the macro base station is to be allocated such that the control channel of the macro base station employs different radio resources than the radio resource corresponding to the control channel of the femto base station.

5. The method of claim 4, wherein the cell ID refers to a physical layer cell ID or a global ID of the cell.

6. The method of claim 4, wherein the radio resource corresponding to a control channel of the femto base station is allocated according to the cell ID.

7. A method of transmitting a control channel, the method comprising:

receiving a first control channel from a femto base station that has informed a macro base station of an allocation of the first control channel;

transmitting, to the macro base station, a cell identifier (ID) of a cell to which the femto base station belongs;

receiving, from the macro base station, information of a second radio resource allocated in relation to information of a first radio resource based on the macro base station correlating the cell ID to the first control channel and allocating the second radio resource as a different radio resource for allocation of a second control channel of the macro base station; and transmitting, from the macro base station, the second control channel using the second radio resource.

8. The method of claim 7, further comprising: transmitting, to the macro base station, the information of a first radio resource receiving the first control channel.

9. The method of claim 8, wherein the first radio resource is allocated according to the cell ID.

* * * * *